United States Patent
Schmidt et al.

(10) Patent No.: US 9,445,277 B2
(45) Date of Patent: Sep. 13, 2016

(54) SYSTEMS AND METHODS FOR DETERMINING AND SPECIFYING SPECTRUM AVAILABILITY FOR A PREDETERMINED TRAVEL ROUTE

(71) Applicant: Spectrum Bridge, Inc., Lake Mary, FL (US)

(72) Inventors: Jeffery C. Schmidt, Orlando, FL (US); Robin U. Roberts, Orlando, FL (US); Peter Stanforth, Winter Springs, FL (US)

(73) Assignee: SPECTRUM BRIDGE, INC., Lake Mary, FL (US)

( * ) Notice: Subject to any disclaimer, the term of this patent is extended or adjusted under 35 U.S.C. 154(b) by 37 days.

(21) Appl. No.: 14/514,672

(22) Filed: Oct. 15, 2014

(65) Prior Publication Data

US 2015/0105116 A1    Apr. 16, 2015

Related U.S. Application Data

(60) Provisional application No. 61/890,980, filed on Oct. 15, 2013.

(51) Int. Cl.
| | |
|---|---|
| *H04W 16/14* | (2009.01) |
| *G01C 21/26* | (2006.01) |
| *H04W 4/02* | (2009.01) |
| *H04W 72/04* | (2009.01) |

(52) U.S. Cl.
CPC .............. *H04W 16/14* (2013.01); *G01C 21/26* (2013.01); *H04W 4/026* (2013.01); *H04W 4/028* (2013.01); *H04W 72/048* (2013.01)

(58) Field of Classification Search
CPC ................ H04W 4/025–4/043; H04W 16/14; H04W 72/048–72/10; G01C 21/26
USPC ............ 455/404.2, 456.1–456.3, 63.1, 67.13
See application file for complete search history.

(56) References Cited

U.S. PATENT DOCUMENTS

| | | | | |
|---|---|---|---|---|
| 5,541,592 | A | * | 7/1996 | Shiihara ................ G01C 21/26 340/988 |
| 6,181,921 | B1 | | 1/2001 | Konisi et al. |
| 6,871,073 | B1 | * | 3/2005 | Boyer .................... H04W 16/10 455/446 |
| 7,085,287 | B1 | | 8/2006 | Chapman |
| 8,514,825 | B1 | | 8/2013 | Addepalli et al. |
| 2007/0211676 | A1 | | 9/2007 | Sharma et al. |
| 2010/0144278 | A1 | | 6/2010 | Vanharlingen et al. |
| 2011/0310865 | A1 | | 12/2011 | Kennedy et al. |
| 2013/0053054 | A1 | * | 2/2013 | Lovitt .................... H04W 4/028 455/456.1 |
| 2013/0115984 | A1 | * | 5/2013 | Schmidt ................ H04W 16/14 455/501 |
| 2013/0147846 | A1 | | 6/2013 | Kalai et al. |

OTHER PUBLICATIONS

International Search Report and Written Opinion for International Application No. PCT/US2014/060600 dated Jan. 26, 2015.

\* cited by examiner

*Primary Examiner* — Raymond Dean
(74) *Attorney, Agent, or Firm* — Tucker Ellis LLP

(57) ABSTRACT

A spectrum management server generates and an electronic device uses a channel map solution for a predetermined travel route of the electronic device. The channel map solution includes at least one available channel for each of the plural geographic areas through which the planned travel route passes. At least two adjacent ones of the geographic areas have different channel availability.

12 Claims, 2 Drawing Sheets

SYSTEMS AND METHODS FOR DETERMINING AND SPECIFYING SPECTRUM AVAILABILITY FOR A PREDETERMINED TRAVEL ROUTE

RELATED APPLICATION DATA

This application claims the benefit of U.S. Provisional Patent Application No. 61/890,980, filed Oct. 15, 2013, the disclosure of which is herein incorporated by reference in its entirety.

TECHNICAL FIELD OF THE INVENTION

The technology of the present disclosure relates generally to wireless communications and, more particularly, to a system and method for making available spectrum determinations and providing a channel map for a planned travel route.

BACKGROUND

Spectrum use in a shared spectrum environment is sometimes controlled by a central geo-location "database." The "database" may be implemented with a server that hosts a spectrum management/allocation engine. The engine identifies channels that are not occupied by an incumbent radio in the current location of a device requesting spectrum and deems those channels available for use by the requesting device. Exemplary channels that may be allocated in this manner are unused digital television channels, also referred to as TV white spaces.

Currently, the methods used for requesting and specifying channel (spectrum) availability in managed wireless ecosystems that employ the use of geo-location "database" technology rely on the notion of a channel map. A channel map provides a list of available channels to a radio that seeks wireless spectrum for conducting wireless communications. A channel map is generated for the current location of the requesting radio device to implement spectrum authorization(s) and usage policies. Some example rules that have been promulgated in the U.S. by the Federal Communications Commission (FCC) to facilitate these methods are summarized below.

Under FCC regulations and by conventional geo-location databases (including those outside the U.S.), the location of the device is essentially treated as a point or coordinate. A channel map for any one location is only valid at the point and within a range of permitted error, which may be only a few meters. As a result, conventional methods of controlling spectrum access can be inefficient, especially for mobile devices that frequently change location or move at high velocities. To obtain an accurate and time-valid channel for the location of the device, the device relies on real-time communications with the central "database" authority that distributes the channels maps. As the device moves and changes location, the channel map must be replaced or updated. Otherwise, the channel map is not valid for a new location of the device.

For instance, an exemplary FCC rule for television band radio devices (TVDBs), as set forth in title 15 of the Code of Federal Regulations (15 C.F.R.) includes 15 C.F.R. §15.711(b), which reads in part: " . . . If the fixed TVBD is moved to another location or if its stored coordinates become altered, the operator shall re-establish the device's: . . . (ii) Registration with the database based on the device's new coordinates." A Fixed TVBD must re-register if moved, and movement is constrained by a registration accuracy requirement of ±50 m.

Another exemplary FCC rule includes 15 C.F.R. §15.711(b)(3)(ii), which reads in part: " . . . A Mode II personal/portable device may load channel availability information for multiple locations around, i.e., in the vicinity of, its current location and use that information in its operation. A Mode II TVBD may use such available channel information to define a geographic area within which it can operate on the same available channels at all locations, for example a Mode II TVBD could calculate a bounded area in which a channel or channels are available at all locations within the area and operate on a mobile basis within that area. A Mode II TVBD using such channel availability information for multiple locations must contact the database again if/when it moves beyond the boundary of the area where the channel availability data is valid, and must access the database daily even if it has not moved beyond that range to verify that the operating channel(s) continue to be available." Only a Mode II TVBD is allowed to use the area protection defined in 15 C.F.R. §15.711(b)(3)(ii).

As indicated, a radio device operating under these types of regulations is required, at least in certain circumstances, to obtain a channel map of available spectrum (e.g., channels) for the current position of the radio device. This ensures that interference with protected devices and incumbent spectrum users will not occur and adversely affect those devices' dominating spectrum rights within the incumbent users' respective protected areas.

As used herein, the term location refers to a regulation-defined point and surrounding permitted error range area for which a channel map having one set of available channels is valid for a radio device. If the radio device were to move out of the location, the radio device would need a new channel map. As indicated, this may be problematic for devices that are in motion. In some cases, a channel map for a geographic area that contains one set of available channels and is valid for multiple locations could be provided (e.g., under the approach of 15 C.F.R. §15.711(b)(3)(ii)). However, providing a channel map covering plural locations is not always practical or efficient. For instance, the set of available channels common to the entire area may be small. In some cases, such as when the area to be considered is relatively large (e.g., covering more than one metropolitan area), the number of available channels for the entire area may be too small to gain benefit or advantage over obtaining new channel maps every time the device has changed location.

DETAILED DESCRIPTION OF EMBODIMENTS

Figure 1:
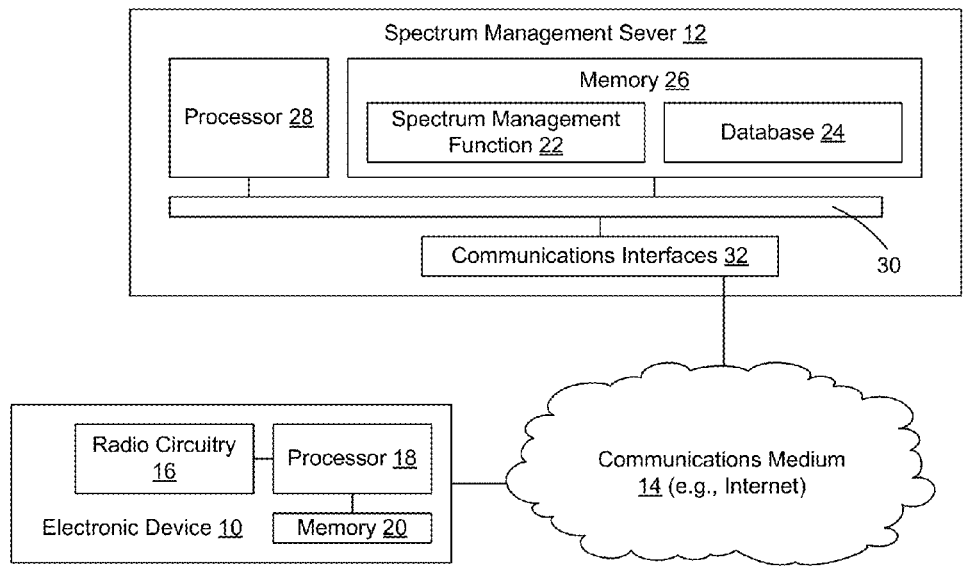
FIG. 1 is a schematic view of an exemplary system for allocating a channel map to a radio device for a planned travel path of the radio device.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

A. Introduction

Techniques for identifying available channels for a moving radio device will be described. In the examples that follow, the moving radio device may be transported by a vehicle. The radio device may be built into the vehicle or may be meant to be carried by a person that is the driver of the vehicle or a passenger. Exemplary vehicles include a train that travels on tracks and a car, bus or truck that travels on roads or highways. In these cases, the intended path of travel of the vehicle may be known. Trains, for example, tend to follow known routes along tracks. As for cars, buses and trucks, a GPS-based navigation system may be used to plan a travel route for which the vehicle may predictably follow. If the vehicle deviates from a predetermined route, the identification of available channels according to the techniques that follow may be deemed invalid and a new available channel solution may be regenerated.

It will be understood that some of the tasks are carried out by the radio device and other tasks are carried out by the spectrum management database system. For these purposes, each of these devices includes appropriate control circuitry and/or processors and memory components. Logical instructions to carry out the respective processes may be embodied as software that is executed by the relevant device and that is stored on a computer readable medium (e.g., computer memory) of the relevant device. Also, communications between the radio device and the spectrum management database system may be through any appropriate medium, such as one or more of the Internet, a cellular network, a WiFi network, etc.

With initial reference to FIG. 1, illustrated is a schematic block diagram of an exemplary system for implementing the disclosed techniques.

Referring initially to FIG. 1, shown is a system that includes an electronic device 10 and a spectrum management server 12. The electronic device 10 may be any type of electronic device that engages in wireless communications, such a mobile phone, a computing device, an information and/or entertainment system, a modem and router for providing Internet connectivity to other devices, etc. The server 12 communicates with the electronic device 10 and other devices over any appropriate communications medium 14. For example, the electronic device 10 may communicate with the server 12 through a network or other appropriate medium, such as one or more of the Internet, a cellular network, a WiFi network, etc. The server 12 may be a central white space registration system or some other form of spectrum management platform.

The electronic device 10 is location aware. For instance, the electronic device 10 may be capable of determining its position (also referred to as geo-location) using a location-determining technique, such as GPS or other technology. In some embodiments, the electronic device 10 may have a GPS receiver that is used to receive GPS satellite signals from which position coordinates are triangulated. Furthermore, the electronic device 10 may be moveable and capable of updating its determined position as it moves.

The electronic device 10 includes communications circuitry, such as the illustrated radio circuitry 16. The radio circuitry 16 may include one or more radio modems (e.g., radio transceivers) and corresponding antenna assemblies to allow for communications over various types of network connections and/or protocols. The radio circuitry 16 may be used to carry out various wireless communications functions, including communicating with the server 12. The communications functions may include, but are not limited to, engaging in voice or video calls, and sending or receiving messages (e.g., email messages, text messages, multimedia messages, instant messages, etc.), accessing the Internet, transferring data (e.g., streaming video, obtaining or sending files), etc.

Overall functionality of the electronic device 10 may be controlled by a control circuit that includes a processing device 18. The processing device 18 may execute code that is stored in a memory 20. For instance, the processing device 18 may be used to execute an operating system and other applications that are installed on the electronic device 10. The operating system or applications may include executable logic to implement the functions of the electronic device 10 that are described herein.

The memory 20 is a non-transitory computer readable medium and may be, for example, one or more of a buffer, a flash memory, a hard drive, a removable media, a volatile memory, a non-volatile memory, a random access memory (RAM), or other suitable device. In a typical arrangement, the memory 20 includes a non-volatile memory for long term data storage and a volatile memory that functions as system memory for the control circuit.

The electronic device 10 may include any other appropriate components such as, but not limited to, a display, a speaker, a microphone, a user interface (e.g., a keypad and/or a touch-sensitive input), motion sensors, etc.

The server 12 may be implemented as a computer-based system that is capable of executing computer applications (e.g., software programs), including a spectrum management function 22 that, when executed, carries out functions of the server 12 that are described herein. The spectrum management function 22 and a database 24 may be stored on a non-transitory computer readable medium, such as a memory 26. The database 24 may be used to store various information sets used to carry out the functions described in this disclosure. The memory 26 may be a magnetic, optical or electronic storage device (e.g., hard disk, optical disk, flash memory, etc.), and may comprise several devices, including volatile and non-volatile memory components. Accordingly, the memory 26 may include, for example, random access memory (RAM) for acting as system memory, read-only memory (ROM), solid-state drives, hard disks, optical disks (e.g., CDs and DVDs), tapes, flash devices and/or other memory components, plus associated drives, players and/or readers for the memory devices.

The server 12 may store or access data about known protected radio devices, which are referred to as incumbent devices or as primary radio devices. The electronic device 10 is considered a secondary radio device 10 that may not cause interference to reception of signals from the primary radio devices in respective protected areas of the primary radio devices.

To execute logical operations, the server 12 may include one or more processors 28 used to execute instructions that carry out logic routines. The processor 28 and the memory 26 may be coupled using a local interface 30. The local interface 30 may be, for example, a data bus with accompanying control bus, a network, or other subsystem.

The server 12 may have various input/output (I/O) interfaces for operatively connecting to various peripheral devices, as well as one or more communications interfaces 32. The communications interface 32 may include for example, a modem and/or a network interface card. The communications interface 32 may enable the server 12 to send and receive data signals, voice signals, video signals, and the like to and from other computing devices via an external network. In particular, the communications interface 32 may operatively connect the server 12 to the communications medium 14.

In one embodiment, the server 12 may be configured to host the below-described services for a plurality of electronic devices, including the electronic device 10. In some embodiments, the services may include spectrum management functions, such as providing channel lists to qualified radio devices upon registration so as to allow the radio devices to make use of spectrum for wireless communications. Also, while the providing of services may be fully automated, the server 12 may host an Internet-style website for the various corresponding parties to conduct initial enrollment with the server 12, conduct manual registration if needed, access various tools and reports supplied by the server 12, and so forth. For supplying the services, the server 12 may collect spectrum usage information from various sources, including but not limited to public databases, private databases and deployed radio devices (e.g., in the form of channel use selections or spectrum sensing results). The database information may contain information about known spectrum users, such as incumbent spectrum users (e.g., digital television stations, wireless microphone systems, cable head end systems, FM radio stations, etc.), licensed spectrum users, or radio systems that are exempt from seeking channel map information in order to operate.

Aspects of the disclosed systems and methods are independent of the type or types of devices that may use spectrum. As such, the systems and methods may be applied in any operational context for wireless communications, and wireless communications are expressly intended to encompass unidirectional signal transmissions (e.g., broadcasting of a signal for receipt by a device without response) and to encompass bidirectional communications where devices engage in the exchange of signals. The methods and systems may be applied to dumb and/or cognitive radio devices. The methods and systems may be applied to licensed or unlicensed spectrum, including but not limited to shared spectrum environments such as white spaces (e.g., TV white spaces or TVWS) where available channels are interleaved with unavailable channels. Furthermore, the methods and systems are generic to modulation schemes, harmonic considerations, frequency bands or channels used by the electronic device, the type of data or information that is transmitted, how the electronic device uses received information, and other similar communications considerations. Thus, the systems and methods have application in any suitable environment.

In embodiments in this disclosure, the server may undertake spectrum management functions other than those that are described in detail, such as responding to white space channel list requests with appropriate channel lists. Therefore, in some embodiments, the server may be considered a central spectrum "database" or white space registration/allocation system.

B. Channel Solution For Planned Travel Route

Available, interference-free spectrum for supporting wireless communications is a scarce resource and the demand for wireless communications is increasing. The following techniques assist in using spectrum efficiently while minimizing interference between incumbent spectrum users and secondary spectrum users.

In one embodiment, the electronic device 10 determines a travel route for a vehicle in which the electronic device 10 will travel. The travel route for the vehicle and, hence, the electronic device 10, may be determined in a manner appropriate for the travel situation. For example, the user may plot a travel route on a map. As another example, the user may specify a destination and a navigation system may determine a route to the specified destination. In this case, the route determined by the navigation system may be used as the travel route. The route may be established by the navigation system in accordance with user input information by the electronic device 10 or may be established by another device and communicated to the electronic device 10. Both of these techniques are considered ways of determining a travel route.

The travel route, once determined, may be considered a route determined prior to travel through the route. As such, the travel route may be referred to as a predetermined route. The predetermined travel route may be communicated to the server 12 by way of a data exchange. The communication of the predetermined travel route may include transmitting the predetermined travel route from the electronic device 10 to the server 12 and receiving the predetermined travel route at the server 12.

The predetermined travel route may take any appropriate format. One exemplary format is a listing of driving or other travel directions including streets and turning instructions. Another exemplary format is a vector format that specifies beginning positions and ending positions for a series of lines representing the predetermined travel route. The beginning and ending positions may be specified as a series of points relative to a two dimensional coordinate system (e.g., each point having an x value along an x-axis and a y value along a y axis that is orthogonal to the x axis, such as x1,y1, x2,y2, etc.). Travel along roads, train tracks, etc., that contain bends and curves may be converted to a vector format by approximating the route using line segments. In one embodiment, the electronic device 10 converts the predetermined travel route specified in a non-vector format to the vector format and communicates the vector format to the server 12. In another embodiment, the predetermined travel route is communicated to the server 12 in a non-vector format and converted by the server 12 to the vector format.

In most cases, if handled in the conventional manner, the predetermined travel route will cross through a large number of regulation-defined locations that each have a conventional channel map specifying channels available to the electronic device 10 for use in supporting wireless communications. That is, if the electronic device 10 were to specify its current position, a corresponding channel map will be valid for the limited location associated with the specified position (e.g., for a fixed location TVBD, a circle having a radius of 50 meters from the specified position). The channel map will not be valid for adjacent locations or other locations along the predetermined travel route.

In some situations, travel may not follow a predetermined path, but may be constrained to the known area. For instance, farm equipment (e.g., a tractor or combine) may be used within the confines of a farm. In this case, instead of defining travel in terms of a predetermined travel route, the area in which the radio device may travel may be defined as a bound travel area with a known perimeter. The disclosed techniques for providing spectrum access to a radio device that follows a predetermined travel route also may be applied to the case of a bound travel area.

The server 12 constructs a channel map solution for the entire predetermined travel route or, in the case of a predetermined bound travel area, the server 12 constructs a channel map solution for the entire bound travel area. The server 12 communicates the channel map solution to the electronic device 10. Preferably, the channel map solution is established and communicated to the electronic device 10 before travel along the route or in the bound area begins, or at least before significant travel has been carried out (e.g., travel out of an area corresponding to the first one to five conventional channel map locations). The channel map solution for the entire predetermined travel route contains one or more available channels for all positions along the travel route and, therefore, the channel map solution is valid for the entirety of the predetermined travel route so long as the channel map solution does not expire due to the passage of time, incumbent use of spectrum changes, or the electronic device 10 deviates from the predetermined travel route. similarly, the channel map solution for the entire predetermined bound travel area contains one or more available channels for all positions in the bound travel area and, therefore, the channel map solution is valid for the entirety of the bound travel area so long as the channel map solution does not expire due to the passage of time, incumbent use of spectrum changes, or the electronic device 10 moves outside the bound travel area.

Therefore, as the electronic device 10 enters and leaves an area in which a conventional channel map may be valid for a corresponding specified position, the electronic device 10 need not request a new channel map for a new position. Rather, the channel map solution may be consulted as the electronic device 10 travels along the predetermined travel route or in the bound travel area to ascertain an available channel for the current position of the electronic device 10.

The channel map solution may contain multiple available channels from which the radio device may select for radio communications while in each of various designated areas along the route or in the bound travel area. Alternatively, the channel map solution may contain a single channel choice that is predetermined by the server 12 for the radio device to use for radio communications while in each designated area along the route or in the bound travel area. As will be described, designated areas may be specified in terms of pixels, geographic areas specified using geometric shapes, or line segments. The term line segment will be used to describe a course from one point to another point regardless of how specified, such as with beginning and ending coordinates, with beginning coordinates, a direction and a distance (e.g., a vector format), etc. The pixel-based and geographic area-based solutions may be preferred approaches for bound travel areas.

For conciseness of description, the remaining description will be made for a predetermined travel route, but also applies to a bound travel area.

The channel map solution may be transmitted from the server 12 to the electronic device 10 as a single data set (e.g., in a single message). This may save communications overhead and eliminates the need for the electronic device 10 to refresh channel access data (e.g., a conventional channel map) as the electronic device 10 moves.

Providing the channel map solution in this a priori manner (e.g., the channel map solution is determined and transferred from the server 12 to the electronic device 10 prior to travel through multiple locations) reduces communication overhead. Moreover, the electronic device 10 has knowledge of available channels for the entire predetermined travel route (or bound travel area) and may make channel use changes immediately at various geographic points along the route during travel (or in the bound travel area).

In this manner, the electronic device 10 need not update or obtain a new channel map as it moves out of each location for which a conventional channel map is valid. The conventional approach would rely on a fairly steady stream of continuous communication while the radio device is moving. When the electronic device 10 is moving rapidly (e.g., driving speed), it is possible that a conventional channel map for a location may be invalid by the time the channel map is requested and returned back to the electronic device 10. In the case of relatively fast moving vehicles, attaining channel authorization in the conventional manner can be problematic. Therefore, the techniques described herein alleviate issues with obtaining valid channel maps in real time as the electronic device 10 moves from one location to another.

B(1). Pixel-Based Channel Map Solution

Figure 2:
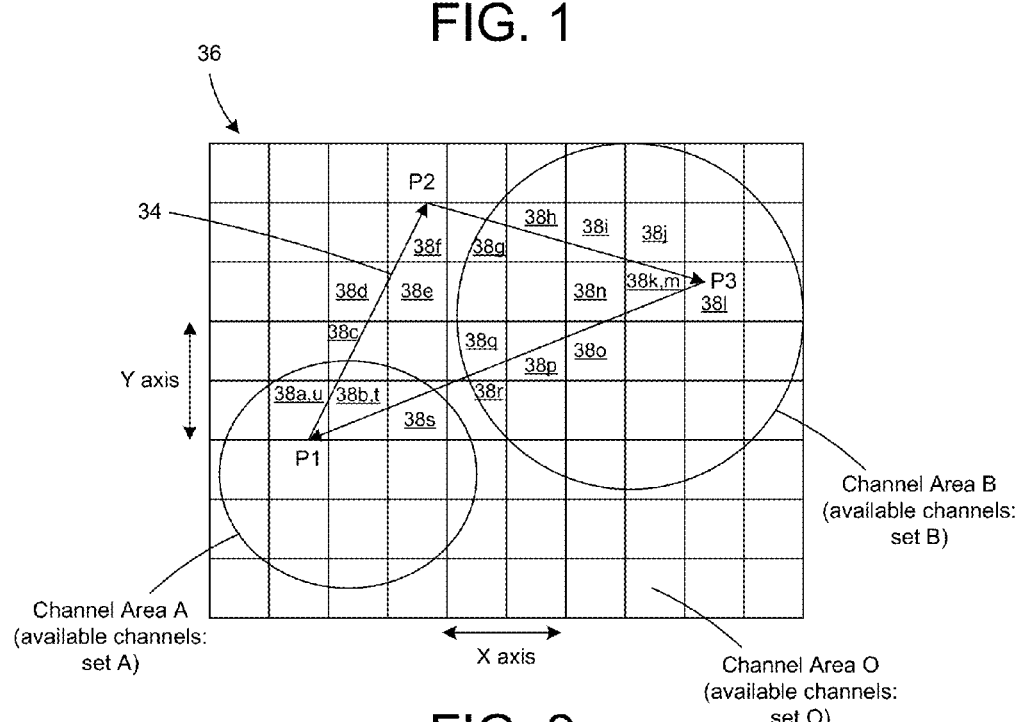
FIG. 2 is a schematic view of a representative spectrum environment for a planned travel path of the radio device in which a pixel-based channel map solution is provided to the radio device.

With additional reference to FIG. 2, illustrated is a predetermined travel route 34 for the electronic device 10 in a pixel-based approach to generating a channel map solution. The pixel-based approach is also referred to as a gridded system approach. In the exemplary illustration of FIG. 2, the predetermined travel route 34 is a series of three line segments including a line segment from a first position (P1) to a second position (P2), from the second position (P2) to a third position (P3), and from the third position (P3) back to the first position (P1). Although the illustrated travel route 34 for the electronic device 10 returns to its starting position (P1), it will be understood that the travel route 34 may start and end in different positions. The term position, as used herein, refers to a geographical point without substantial surrounding area. This is in contrast to the above-described meaning of the term location.

In the embodiment of FIG. 2, the line segments making up the predetermined travel route 34 are laid out relative to a uniform grid 36 of pixels 38 (also referred to as cells). Each pixel 38 corresponds to geographical area. Each pixel 38 has the same size (in area) and shape as every other pixel 38. The pixels 38 may be squares (as illustrated), hexagons, or some other shape. The pixels 38 may be related to actual geographic areas using any appropriate format, such as geographic information system (GIS) coordinates.

A channel map solution for this pixel-based embodiment includes an identification of one or more available channels for each pixel 38 through which the predetermined travel route 34 passes. In this embodiment, channel availability is provided for each pixel 38 in which the electronic device 10 is predicted to travel even though channel availability for adjacent pixels 38 is sometimes identical. In case of a bound travel area, the channel map solution may contain an identification of one or more available channels for each pixel 38 that overlaps with the bound travel area.

The size of each pixel 38 may be based on the location-determining accuracy of the electronic device 10 to keep the area of each pixel 38 to a minimum. In this manner, it is contemplated that, on average, a higher number of channels will be available in each pixel 38 than if larger areas for the pixels 38 were used. In one example, the size of each pixel in any one dimension is the same as the location-determining accuracy of the electronic device 10. For instance, if the location accuracy for the electronic device 10 is ±50 meters (m), then it would be appropriate to adopt a pixel grid of 50 meters resolution (e.g., squares of pixels 38 that are 50 meters by 50 meters). In another embodiment, pixel size may be based on a system resolution specified by the server 12.

For the representative illustration of FIG. 2, in order to specify and obtain a valid channel map solution for travel from P1 to P2, from P2 to P3, and P3 to P1, the server 12 analyzes knowledge of channel availability in approximately 21 pixels 38a-38u. The analyzed pixels 38 are the pixels 38 through which the predetermined travel route 34 passes. It is noted that, in one embodiment, the analyzed pixels 38 are specified in the order in which they are crossed by the predetermined travel route 34. Therefore, for the illustrated example, some pixels 38 are repeated in the channel map solution. The analysis is preferable performed in advance of travel of the electronic device 10. Table 1 shows an exemplary channel map solution for the representative illustration of FIG. 2, in which channels in channel set A are available in channel area A, channels in channel set B are available in channel area B, and channels in channel set O are available in all other areas (channel area O). Channel sets A and B are contemplated as having fewer available channels than channel set O due to the presence of additional incumbent radios. For pixels 38 that overlap with two or more areas having differing channel availability, the intersection of the respective sets of available channels under set theory will be the channels considered as available for use by the electronic device 10 when the electronic device 10 is in the pixel 38. Therefore, in table 1, the set theory symbol "∩" represents the intersection of the identified sets (i.e., the channels belonging to both identified sets).

TABLE 1

| Pixel | Available Channel(s) |
| --- | --- |
| 38a | set A |
| 38b | set A |
| 38c | set A ∩ set O |
| 38d | set O |
| 38e | set O |
| 38f | set O |
| 38g | set O ∩ set B |
| 38h | set B |
| 38i | set B |
| 38j | set B |
| 38k | set B |
| 38l | set B |
| 38m | set B |
| 38n | set B |
| 38o | set B |
| 38p | set B |
| 38q | set O ∩ set B |
| 38r | set O ∩ set B ∩ set A |
| 38s | set A ∩ set O |
| 38t | set A |
| 38u | set A |

In one embodiment, all available channels for each pixel 38 are communicated to the electronic device 10 as part of the channel map solution. In this embodiment, the electronic device 10 stores the channel availability data from the received channel map solution. During travel along the predetermined travel route 34, the electronic device 10 tracks its location and uses an appropriate available channel when in each respective pixel area 38. In another embodiment, the server 12 selects one available channel per pixel 38 and communicates only the selected channels to the electronic device as part of the channel map solution. In this embodiment, the electronic device 10 stores the channel availability data from the received channel map solution and uses the server-selected channel when in each respective pixel area 38. The server 12 may make the channel selection based on one or more criteria such as, but not limited to, load sharing, predicted performance, probable interference from other transmitters, minimization of channel switching by the electronic device 10 along the predetermined travel route, and preferences of the electronic device 10.

B(2). Area-Based Channel Map Solution

Figure 3:
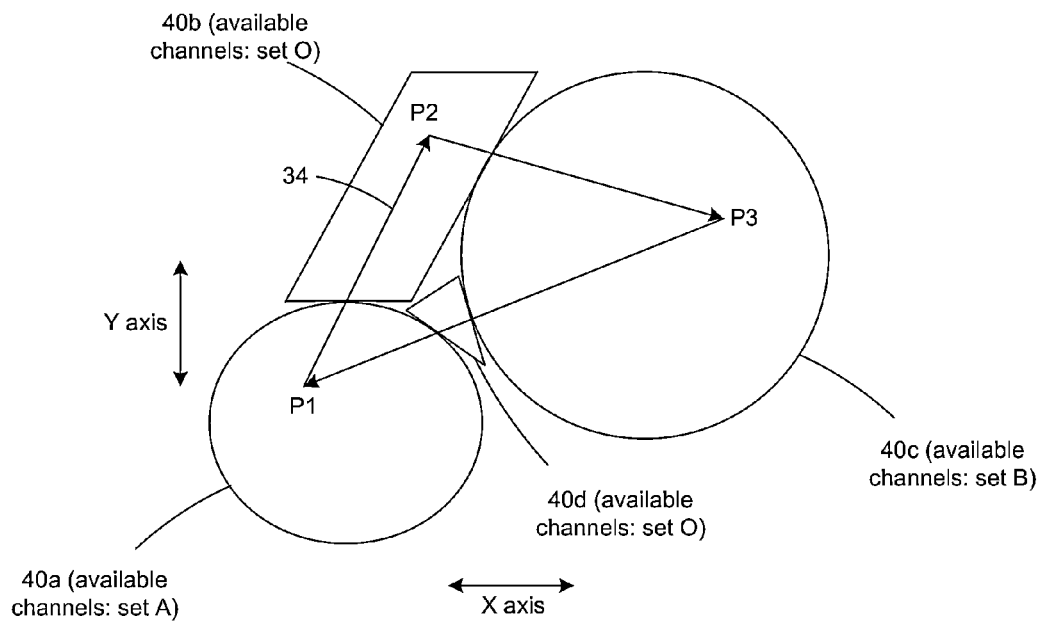
FIG. 3 is a schematic view of a representative spectrum environment for a planned travel path of the radio device in which an area-based channel map solution is provided to the radio device.

With reference to FIG. 3, illustrated is a predetermined travel route 34 for the electronic device 10 in an area-based approach to generating a channel map solution. For purposes of description, the predetermined travel route in FIG. 3 is the same as the predetermined travel route 34 in FIG. 2. Similarly, use of spectrum by incumbent users is the same as depicted in FIG. 2. Therefore, the areas in which channel sets A, B and O are available for use by the electronic device 10 are the same in FIGS. 2 and 3.

In this embodiment, channel availability for the electronic device 10 and along the predetermined travel route 34 is specified in connection with a series of channel areas 40. Each area 40 has a corresponding authorized channel availability solution. Along the predetermined channel route, the channel areas 40 combine to contiguously specify available channels. But, in one embodiment, the channel areas 40 do not overlap one another. The channel areas 40 may be geometric shapes and may be specified in any appropriate format, such as with GIS coordinates. In case of a bound travel area, the channel map solution may contain an identification of one or more available channels for channel areas 40 that combine to cover the entire bound travel area.

Relative to the pixel-based approach, it is contemplated that the area-based will have fewer areas for which available channels are specified due to consolidation of geographic areas with identical channel availability. In this approach, channel availability is determined for the series of areas 40 in which the electronic device 10 is predicted to travel. The entire area of probable travel is subdivided into the channel areas 40, each with its own authorized channel availability solution.

Referring to the representative example shown in FIG. 3, the electronic device 10 is predicted to travel through four channel areas 40a-40d. In the first channel area 40a, the channels of channel set A are available. In the second channel area 40b, the channels of channel set O are available. In the third channel area 40c, the channels of channel set B are available. In the fourth channel area 40d, the channels of channel set O are available. It is noted that the channel availability in channel area 40b and 40d are the same. Thus, the geographical identification of these channel areas 40b and 40d could be combined into one channel area 40 through which the electronic device 10 travels twice.

In one embodiment, all available channels for each channel area 40 are communicated to the electronic device 10 as part of the channel map solution. In this embodiment, the electronic device 10 stores the channel availability data from the received channel map solution. During travel along the predetermined travel route 34, the electronic device 10 tracks its location and uses an appropriate available channel when in each respective channel area 40. In another embodiment, the server 12 selects one available channel per channel area 40 and communicates only the selected channel to the electronic device as part of the channel map solution. In this embodiment, the electronic device 10 stores the channel availability data from the received channel map solution and uses the server-selected channel when in each respective channel area 40. The server 12 may make the channel selection based on one or more criteria such as, but not limited to, load sharing, predicted performance, probable interference from other transmitters, minimization of channel switching by the electronic device 10 along the predetermined travel route, and preferences of the electronic device 10.

B(3). Vector-Based Channel Map Solution

Figure 4:
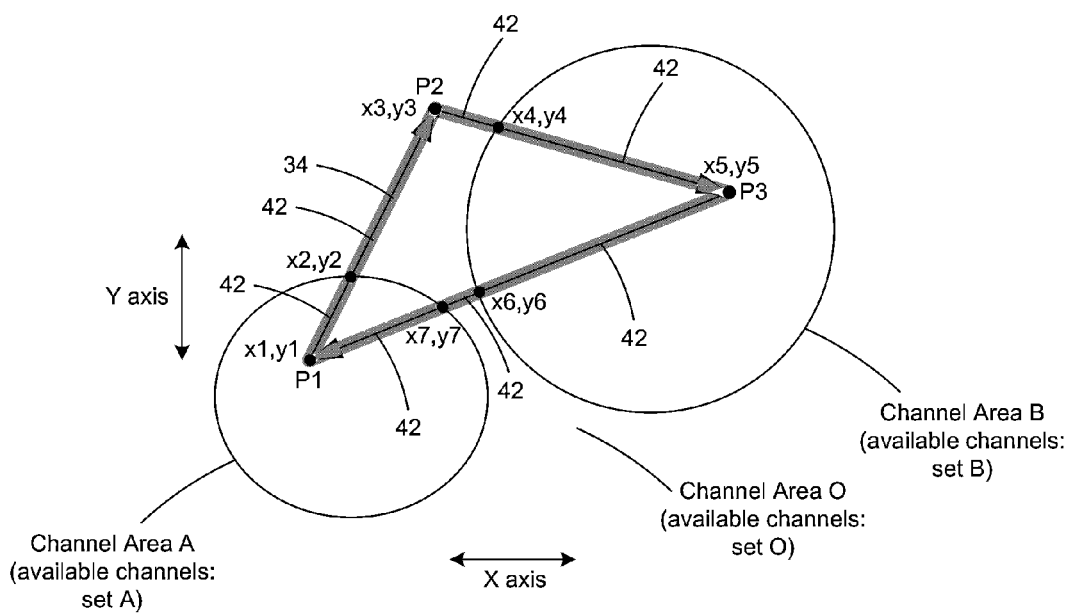
FIG. 4 is a schematic view of a representative spectrum environment for a planned travel path of the radio device in which an area-based channel map solution is provided to the radio device.

With reference to FIG. 4, illustrated is a predetermined travel route 34 for the electronic device 10 in a vector-based approach to generating a channel map solution. For purposes of description, the predetermined travel route in FIG. 4 is the same as the predetermined travel route 34 in FIGS. 2 and 3. Similarly, use of spectrum by incumbent users is the same as depicted in FIGS. 2 and 3. Therefore, the areas in which channel sets A, B and O are available for use by the electronic device 10 are the same in FIGS. 2, 3 and 4.

In this approach, the predetermined travel route 34 is identified as a series of line segments 42. Each line segment has a starting point and an ending point. In one embodiment, the starting points and ending points are identified by coordinates, such as the illustrated x-y coordinates. Other coordinates may be used, such as GIS coordinates or GPS coordinates. For each vertex in the predetermined travel route, there is a line segment ending at the vertex and a line segment starting at the vertex. Also, each intersection of the predetermined travel route 34 and a boundary between two areas where channel availability is different will be treated as a vertex. Thus, even though the predetermined travel route 34 may be straight at this intersection, the predetermined travel route 34 will have a line segment ending at the intersection and a line segment starting at the intersection. When taken in order, the line segments 52 follow the predetermined travel route 34.

The line segments 42 of the predetermined travel route 34 are assigned a width (represented by the grey area through which the line segments extend in FIG. 4). For each line segment 42, the width is measured in a direction orthogonal to the direction of the line segment 42. An exemplary width is about 50 meters. Another exemplary width is the numerical value of location-determining accuracy of the electronic device (e.g., the width is 50 meters if the location determining accuracy is ±50 meters).

Each line segment 42 is associated with one or more available channels for the electronic device 10. The available channels associated with each line segment 42 are the channels in the available channel set for the geographic area though which the line segment 42 traverses.

For each line segment 42, while the electronic device 10 travels along the line segment 42 and within the width of the line segment 42, the electronic device may use any of the available channels associated with the light segment 42. For logical processing by the electronic device 10 and/or the server 12, the line segments 42 of specified width may be operated on in a spatial manner as a line between two points with a buffer area of half the specified width. Thus, a channel map solution containing the line segments 42 and associated available channels may be calculated deterministically by the server 12 for the predetermined travel route 34 and communicated to the electronic device 10 prior to travel by the electronic device 10.

In this vector-based embodiment, and the previously described embodiments, the channel map solution may include an expiration time, after which the channel map solution is invalid. If the channel map solution becomes invalid due to its expiration or by the electronic device 10 travelling outside the width of the line segments 42, then a new channel map solution may be requested by the electronic device 10. In response to a request for a new channel map solution, the server 12 may establish the new channel map solution and communicate the new channel map solution to the electronic device 10.

In one embodiment, the server 12 selects one available channel per line segment 42, thereby preselecting the channel that is to be used by the electronic device 10 while travelling along the corresponding line segment 42. The server 12 may make the channel selection based on one or more criteria such as, but not limited to, load sharing, predicted performance, probable interference from other transmitters, minimization of channel switching by the electronic device 10 along the predetermined travel route, and preferences of the electronic device 10.

In another embodiment, the server 12 associates more than one available channel for each line segment 42, so long as more than one channel is available along the corresponding line segment 42. In this embodiment, the server 12 may identify up to the full number of available channels for each line segment 42. In the case of a channel map solution with plural channels per line segment 42, the electronic device 10 may select any of the identified channels for use in supporting wireless communications while travelling along the corresponding line segment 42.

Table 2 is an exemplary data set that sets out a channel map solution for the line segments 42 for the predetermined travel route 34 and channel availabilities depicted in the representative example of FIG. 4. Each row in table 2 identifies a line segment 42 and a corresponding available channel set. When the electronic device 10 reaches the end of line segment 42, the radio device may transition to the next line segment 42 and, if appropriate according to the identified channel(s), switch channel use to continue wireless communications. For this purpose, the radio device monitors its location (e.g., by GPS location tracking) and switches between channels as appropriate during its progression along the predetermined travel route 34.

TABLE 2

| Line Segment | Available Channel(s) |
| --- | --- |
| x1, y1:x2, y2 | set A |
| x2, y2:x3, y3 | set O |
| x3, y3:x4, y4 | set O |
| x4, y4:x5, y5 | set B |
| x5, y5:x6, y6 | set B |
| x6, y6:x7, y7 | set O |
| x7, y7:x1, y1 | set A |

As indicated, another exemplary format for the channel map solution may contain one channel per line segment 42. This channel map solution may be specified in the following exemplary format: {x1,y1:x2,y2,chA; x2,y2:x3,y3, chB; . . . }.

In one embodiment, the electronic device 10 may evaluate the channel map solution at one or more times to make efficient channel use selections. For example, the electronic device 10 may evaluate the available channels associated with the line segments 42 to determine if there is an available channel common to all of the line segments 42 and, if so, use the common channel along the entire predetermined travel route 34. If a common channel is not available, the electronic device 10 may select channels to minimize switching of channels along the predetermined travel route 34. These determinations and channel selections also may be carried out the pixel-based and area-based solutions.

C. Conclusion

In the illustrated examples, the route of the radio device returns the radio device to its starting point. It will be appreciated that the route of the radio device may end in a location different than the starting location. Regardless, the channel map solution provides information regarding available channels along the entire predetermined travel route so that the electronic device 10 may continuously engage in wireless communications along the entire predetermined travel route. Also, curves in the travel path may be approximated by a series of straight line segments. In an alternative, the route may be specified as a series curves instead of straight line segments. In this alternative, and under the vector-based channel map solution, each curve in the series will have an associated set of available channels.

Although certain embodiments have been shown and described, it is understood that equivalents and modifications falling within the scope of the appended claims will occur to others who are skilled in the art upon the reading and understanding of this specification.

What is claimed is:

1. A spectrum management server, comprising:
a communications interface over which communications with an electronic device are made, the electronic device having a need for spectrum access to carry out wireless communications; and
a processor that executes logical instructions to configure the spectrum management server to:
 determine a planned travel route of the electronic device;
 analyze the planned travel route against incumbent use of spectrum and identify available channels for use by the electronic device for an entire area of each of plural geographic areas through which the planned travel route passes, at least two adjacent ones of the geographic areas having different channel availability, and wherein each geographic area is a pixel from a grid of pixels, each pixel having a same area and shape and wherein each available channel is unoccupied by an incumbent user; and
 communicate a channel map solution to the electronic device, the channel map solution including at least one available channel for each of the plural geographic areas; and
wherein a size of each pixel is based on a location-determining accuracy of the electronic device and selected to conform an area of each pixel to a valid channel map generation area for the electronic device on a per pixel basis, said conformance increasing an average number of available channels per pixel for the pixels through which the planned travel route passes relative to pixels larger than the selected size.

2. The spectrum management server of claim 1, wherein if a pixel overlaps two regions with different channel availability, the available channels for the pixel is a set intersection of the available channels from the two regions.

3. A spectrum management server, comprising:
a communications interface over which communications with an electronic device are made, the electronic device having a need for spectrum access to carry out wireless communications; and
a processor that executes logical instructions to configure the spectrum management server to:
 determine a planned travel route of the electronic device;
 analyze the planned travel route against incumbent use of spectrum and identify available channels for use by the electronic device for an entire area of each of plural geographic areas through which the planned travel route passes, at least two adjacent ones of the geographic areas having different channel availability, wherein each available channel is unoccupied by an incumbent user; and
 communicate a channel map solution to the electronic device, the channel map solution including at least one available channel for each of the plural geographic areas; and
wherein each geographic area is a line segment along the planned travel route, each line segment having a width, the width selected to conform validity of the channel map solution to a location-determining accuracy of the electronic device.

4. The spectrum management server of claim 3, wherein one of the line segments ends and one of the line segments starts at each vertex of the planned travel route.

5. The spectrum management server of claim 3, wherein one of the line segments ends and one of the line segments starts at each intersection of the planned travel route and a border between two regions of different channel availability.

6. The spectrum management server of claim 1, wherein the server further selects one channel per geographic area to communicate to the electronic device.

7. The spectrum management server of claim 1, wherein, as part of the channel map solution communicated to the electronic device, the server includes plural available channels per geographic area.

8. The spectrum management server of claim 1, wherein the channel map solution comprises an expiration.

9. The spectrum management server of claim 3, wherein the planned travel route is approximated by and expressed as a series of line segments.

10. The spectrum management server of claim 3, wherein the server further selects one channel per geographic area to communicate to the electronic device.

11. The spectrum management server of claim 3, wherein, as part of the channel map solution communicated to the electronic device, the server includes plural available channels per geographic area.

12. The spectrum management server of claim 3, wherein the channel map solution comprises an expiration.

* * * * *